United States Patent
Ito

(10) Patent No.: US 8,218,040 B2
(45) Date of Patent: Jul. 10, 2012

(54) IMAGE PROCESSING APPARATUS, IMAGE PROCESSING METHOD AND COMPUTER-READABLE STORAGE MEDIUM

(75) Inventor: Akiharu Ito, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 376 days.

(21) Appl. No.: 12/490,319

(22) Filed: Jun. 24, 2009

(65) Prior Publication Data

US 2009/0322914 A1 Dec. 31, 2009

(30) Foreign Application Priority Data

Jun. 26, 2008 (JP) .................................. 2008-167871

(51) Int. Cl.
*H04N 9/64* (2006.01)
*H04N 9/73* (2006.01)
(52) U.S. Cl. ..................................... 348/248; 348/223.1
(58) Field of Classification Search ........... 348/241–251
See application file for complete search history.

(56) References Cited

U.S. PATENT DOCUMENTS

| | | | | |
|---|---|---|---|---|
| 6,809,763 | B1* | 10/2004 | Yoshida | 348/248 |
| 7,358,993 | B2* | 4/2008 | Kawanishi et al. | 348/248 |
| 7,545,420 | B2 | 6/2009 | Kondo | |
| 7,586,527 | B2* | 9/2009 | Noguchi | 348/248 |
| 7,710,473 | B2* | 5/2010 | Sato | 348/249 |
| 7,847,979 | B2* | 12/2010 | Ptucha et al. | 358/3.26 |
| 2004/0012690 | A1* | 1/2004 | Makioka | 348/222.1 |
| 2005/0264661 | A1 | 12/2005 | Kawanishi | |
| 2006/0232692 | A1* | 10/2006 | Takane | 348/248 |
| 2007/0165120 | A1* | 7/2007 | Takane | 348/248 |
| 2009/0091641 | A1* | 4/2009 | Hattori | 348/241 |

FOREIGN PATENT DOCUMENTS

| | | |
|---|---|---|
| CN | 1543196 A | 11/2004 |
| JP | 04-280579 A | 10/1992 |
| JP | 2005-303785 A | 10/2005 |
| JP | 3788393 B2 | 6/2006 |
| JP | 2008-034913 A | 2/2008 |

\* cited by examiner

*Primary Examiner* — Trung Diep
(74) *Attorney, Agent, or Firm* — Canon U.S.A., Inc. IP Division

(57) ABSTRACT

An imaging apparatus includes a smear detection unit configured to detect the amount of smear from an image signal, a smear correction unit configured to execute smear correction based on the detected amount of smear, and an image processing unit configured to execute image processing based on the detected amount of smear.

15 Claims, 5 Drawing Sheets

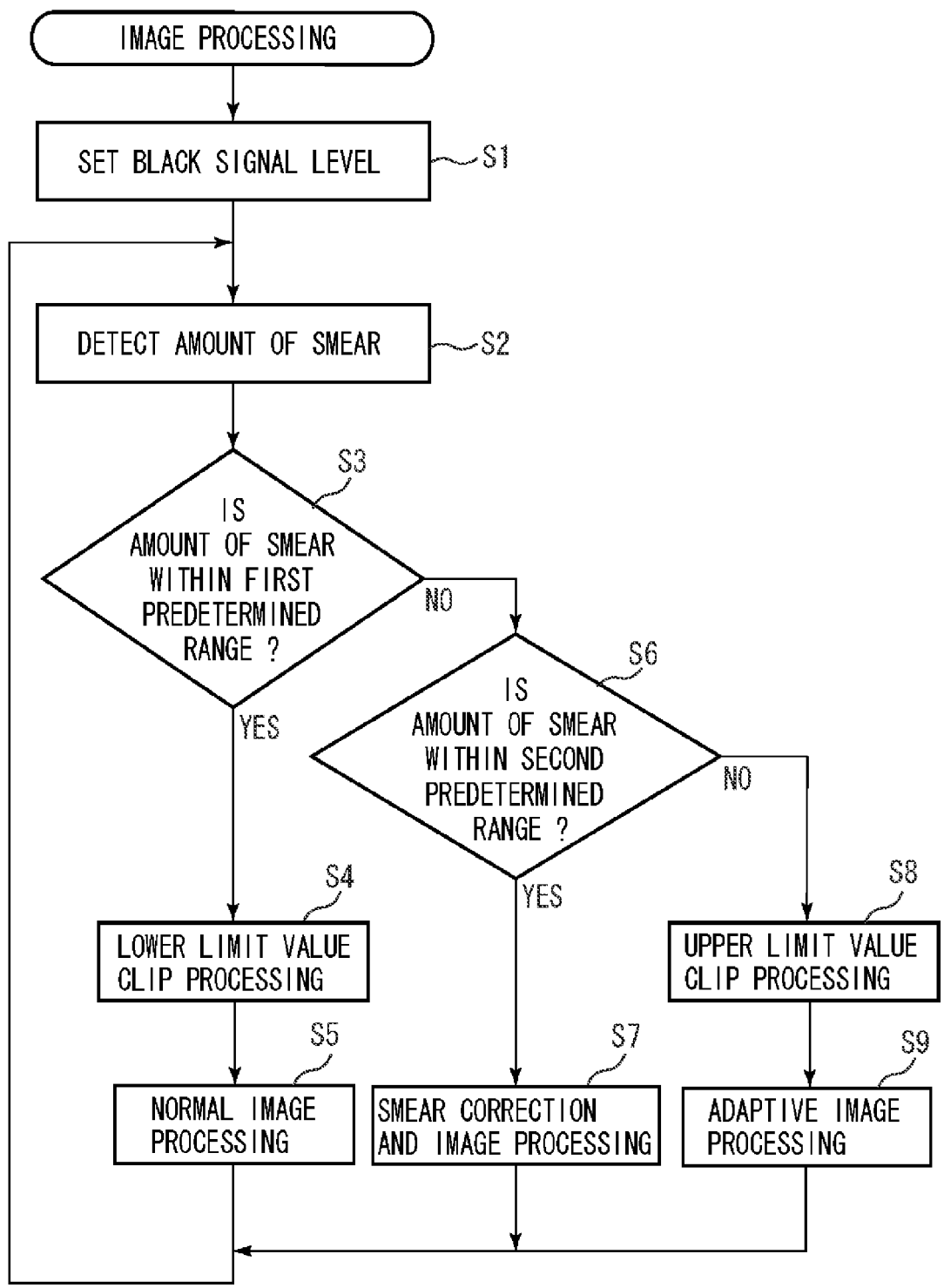

IMAGE PROCESSING APPARATUS, IMAGE PROCESSING METHOD AND COMPUTER-READABLE STORAGE MEDIUM

BACKGROUND OF THE INVENTION

1. Field of the Invention

The present invention relates to a technique to correct a smear which is contained in an image captured by an imaging apparatus.

2. Description of the Related Art

When a high luminance object is captured by a charge coupled device (CCD) sensor, a phenomenon named smear, in which a bright strip line appears in a vertical direction of a captured image, may occur. When the smear occurs, the image quality of a captured image is reduced. In order to prevent occurrence of the smear, a method has been adopted, which determines the amount of smear from an output level of a vertical optical black (OB) that is a shielded pixel area outside an effective pixel area, and a dummy pixel area having no sensitivity to light, and subtracts the amount of smear obtained by an image signal.

However, recently, owing to a higher pixel density of the CCD sensor, a pixel size has increasingly shown a tendency to be minimized and also an image reading time tends to increase. Thus, a smear occurs even when a low-luminance object is imaged, which has heretofore never caused a problem. Further, when a high luminance object such as the sun is imaged, an unimaginable strong smear occurs, which has not been conventionally considered.

An imaging signal processing apparatus discussed in Japanese Patent Application Laid-Open No. 4-280579 is configured to correct smear by controlling a gain of a luminance gamma correction circuit and a gain of a color difference signal without subtracting a smear signal. Further, a digital still camera apparatus discussed in U.S. Pat. No. 3,788,393 is configured to correct smear by detecting the amount of smear from a plurality of images in order to reduce a weak smear signal.

However, the imaging signal processing apparatus discussed in Japanese Patent Application Laid-Open No. 4-280579 cannot achieve a sufficient correction effect when correcting a large smear signal.

Further, the digital still camera apparatus discussed in U.S. Pat. No. 3,788,393 has a smear occurring in a moving image, and strong smear cannot be reduced.

SUMMARY OF THE INVENTION

The present invention is directed to a method for executing suitable smear correction to an image signal wherein the smear can be detected without reducing image quality.

According to an aspect of the present invention, an imaging apparatus includes a smear detection unit configured to detect the amount of smear from an image signal, a smear correction unit configured to execute smear correction based on the detected amount of smear, and an image processing unit configured to execute image processing based on the detected amount of smear.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a flowchart illustrating an operation of an imaging apparatus according to an exemplary embodiment of the present invention.

DETAILED DESCRIPTION OF THE EMBODIMENTS

Various exemplary embodiments, features, and aspects of the invention will be described in detail below with reference to the drawings.

Figure 1:
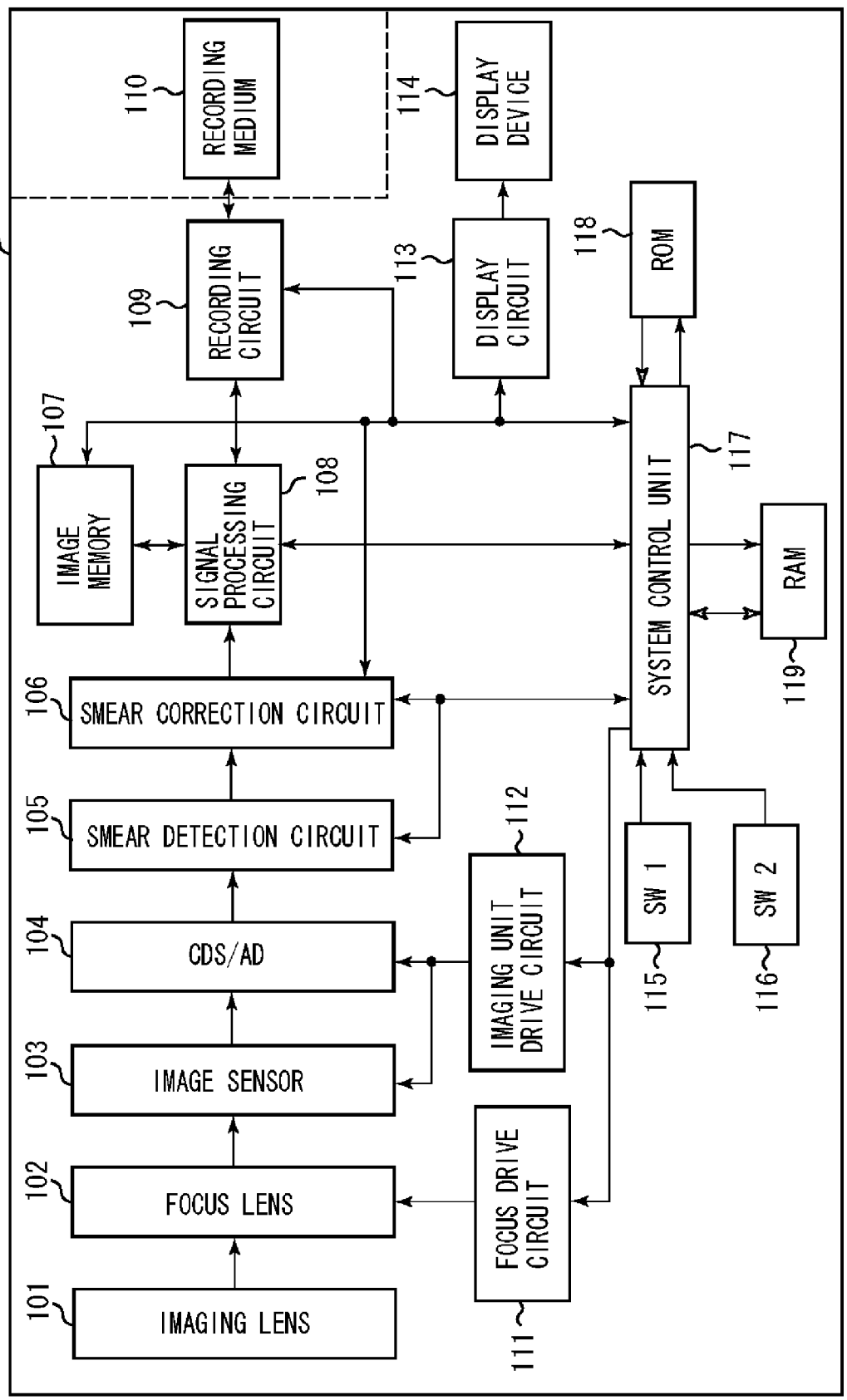
FIG. 1 is a block diagram illustrating a configuration of an imaging apparatus according to an exemplary embodiment of the present invention.

FIG. 1 is a block diagram illustrating a configuration of an imaging apparatus 100 according to an exemplary embodiment of the present invention.

An imaging lens 101 and a focus lens 102 are shown in FIG. 1. The focus lens 102 adjusts focus by changing the focus position in an optical axis direction. An image sensor 103 includes a CCD sensor or the like. The image sensor 103 photo-electrically converts a luminous flux of an object image passing through the imaging lens 101 into an electric signal.

A correlated double sampling/analog to digital (CDS/AD) unit 104 executes clamp processing and gain processing to an analog signal output from the image sensor 103 to convert the analog signal into a digital signal. A focus drive circuit 111 controls the focus lens 102. An imaging unit drive circuit 112 controls the image sensor 103 and the (CDS/AD) unit 104.

A smear detection circuit 105 detects a smear signal from a digital signal (image signal) converted in the CDS/AD unit 104 under control of a system control unit 117 and also detects the amount of smear in a smear signal. The smear detection circuit 105 detects a smear signal based on an optical black (OB) pixel area serving as an optical light-shielding pixel of the image sensor 103, and/or a dummy pixel area that does not have sensitivity to light. The smear detection circuit 105 transmits the detection result to a smear correction circuit 106 and a system control unit 117 which will be described below. The smear detection circuit 105 transmits the amount of smear for each pixel area. Since a smear signal is a noise which is generated mainly when an electric charge is superimposed on a light-shielded vertical transfer pixel, the smear detection circuit 105 can easily detect a smear signal from the OB pixel area and the dummy pixel area.

A smear correction circuit 106 sets a smear correction amount based on the detected amount of smear under control of the system control unit 117. Further, the smear correction circuit 106 executes smear correction of an image signal by a set smear correction amount.

Figure 2:
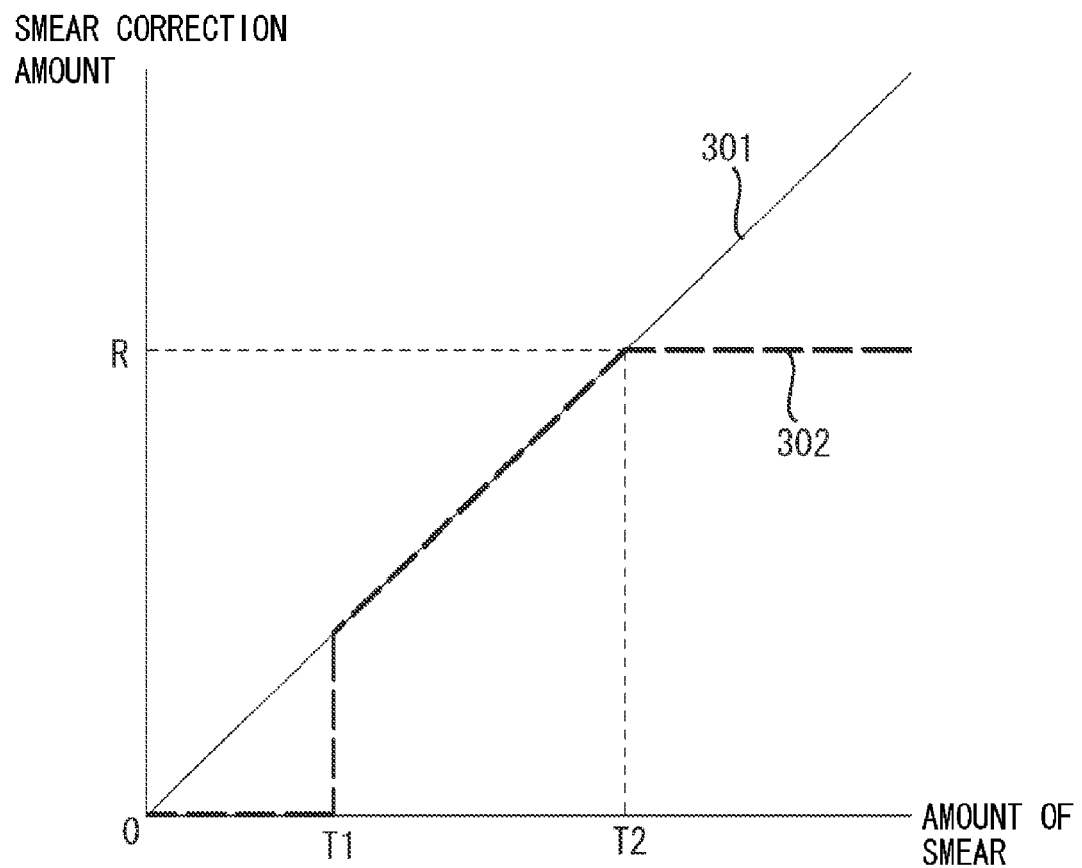
FIG. 2 is a diagram illustrating a smear correction amount which is corrected based on the amount of smear.

Now, referring to FIG. 2, a smear correction amount that the smear correction circuit 106 sets based on the amount of smear will be described. In FIG. 2, the horizontal axis indicates the detected amount of smear and the vertical axis indicates a smear correction amount which is to be set.

A characteristic line 301 illustrated in FIG. 2 indicates a smear correction amount which is conventionally set based on the amount of smear. Conventionally, as indicated by the characteristic line 301, a smear correction amount is set in proportion to the amount of smear. Accordingly, as the amount of smear is increased, a large smear correction amount is subtracted from an image signal. Thus, if a pixel which produces only a small amount of smear is corrected by a large smear correction amount, an image signal from the pixel becomes too small due to overcorrection and an image quality is deteriorated.

On the other hand, a characteristic line 302 shown in FIG. 2 indicates a smear correction amount which is set based on the amount of smear according to the present exemplary embodiment.

In the present exemplary embodiment, the smear correction circuit 106 holds information on the characteristic line 302. However, instead of the smear correction circuit 106, a read only memory (ROM) 118 stores the information, and the system control unit 117 reads the information from the ROM 118 and sets it to the smear correction circuit 106.

In the characteristic line 302, in a range where the amount of smear is exceedingly small (in a range from 0 to T1 shown in FIG. 2), the smear correction circuit 106 limits and sets a smear correction amount to a lower limit value (herein, smear correction amount is set at 0). Further, when the amount of smear is in a range of a predetermined amount (in a range from T1 to T2 shown in FIG. 2), the smear correction circuit 106 sets a smear correction amount in proportion to the amount of smear. Furthermore, when the amount of smear is equal to or more than a predetermined amount (T2 shown in FIG. 2 or larger), a smear correction amount is limited and set to an upper limit value (herein, smear correction amount is set at R). Thus, even if the amount of smear is large, the smear correction circuit 106 limits a smear correction amount to an upper limit value, thereby preventing a reduction in image quality due to overcorrection.

Further, the smear correction circuit 106 allows smear correction in any image area within an effective pixel area detected by the smear detection circuit 105. Then, the smear correction circuit 106 can adaptively set a smear correction amount for each image area corresponding to the detected amount of smear.

Figure 3:
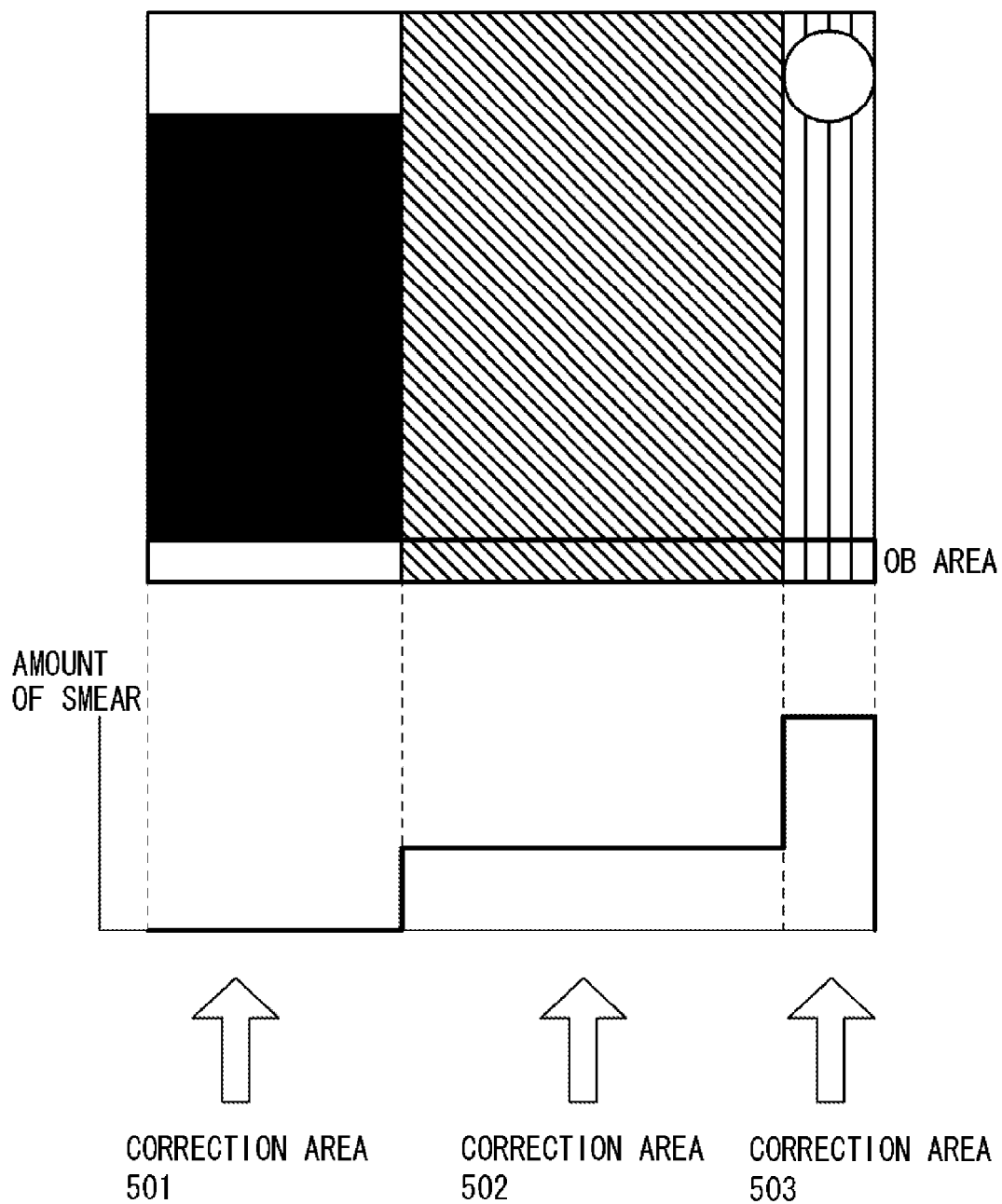
FIG. 3 is a diagram illustrating a phenomenon in which the amount of smear varies for each image area.

Now, referring to FIG. 3, an image which shows a different amount of smear for each image area will be described. FIG. 3 is a diagram illustrating one example of an image captured with respect to a high luminance object. Among images shown in FIG. 3, a correction area 501 is an area which shows a small amount of smear signal since a black object is present. Further, a correction area 502 is an area where a wide and thin smear signal is superimposed on a blue sky. Furthermore, a correction area 503 is an area where a strong smear signal is superimposed since a high luminance object such as the sun is present. The smear correction circuit 106 sets a smear correction amount for each image area, in other words, for each correction area 501, correction area 502 and correction area 503, and executes smear correction.

More specifically, the smear correction circuit 106 sets a smear correction amount to a lower limit value shown in FIG. 2 with respect to the correction area 501, which has a small amount of smear signal to execute smear correction. Further, the smear correction circuit 106 sets a smear correction amount to a smear correction amount proportional to the amount of smear in the correction area 502, which shows a thin smear signal to execute smear correction. Furthermore, the smear correction circuit 106 sets a smear correction amount to an upper limit value shown in FIG. 2 with respect to the correction area 503, which shows a strong smear signal to execute smear correction. Thus, smear correction is executed corresponding to the detected smear amount, so that suitable smear correction is executed. In particular, when a smear signal is strong, since a smear correction amount is limited and set to an upper limit value, so that decline of an image signal caused by overcorrection can be prevented. Furthermore, smear correction is executed for each image area, so that smear correction suitable for each image area can be executed.

Referring back to a block diagram in FIG. 1, a signal processing circuit 108 executes image processing such as white balance processing, pixel interpolation processing, color signal processing, luminance signal processing, and color gain adjustment to an image signal which has been subjected to smear correction by the smear correction circuit 106 or an image signal from the system control unit 117.

In the above-described smear correction circuit 106, in order to prevent an image signal from declining due to overcorrection, when a smear signal is strong, a smear correction amount has been limited and set to an upper limit value. Accordingly, it is insufficient as smear correction. Thus, a smear may remain on an image. Therefore, the signal processing circuit 108 executes image processing so that a smear becomes inconspicuous based on the amount of smear. More specifically, since a smear contains the color component of magenta, the signal processing circuit 108 executes white balance so as to moderate the color component of magenta corresponding to the amount of smear.

Figure 4:
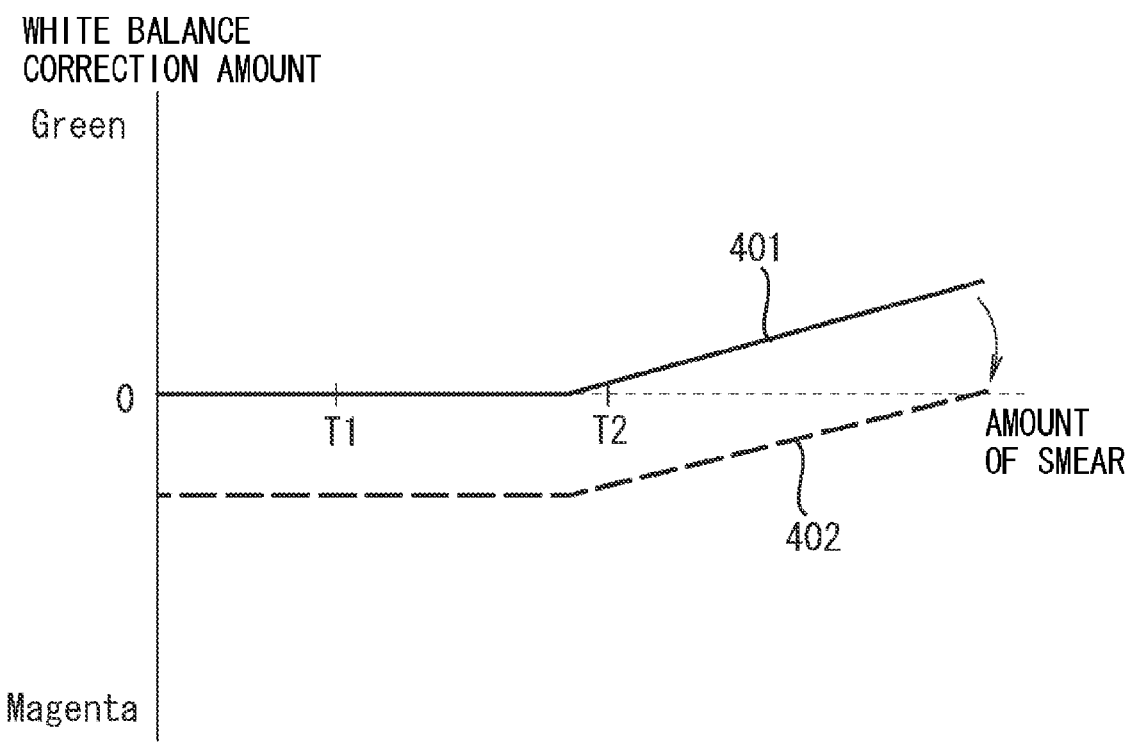
FIG. 4 is a diagram illustrating white balance correction which is executed based on a color temperature of external light.

Now, referring to FIG. 4, a case in which the signal processing circuit 108 executes image processing (white balance processing) based on the amount of smear will be described. In FIG. 4, the horizontal line designates the detected amount of smear and the vertical line designates a white balance correction amount which will be set. In FIG. 4, a one-dimensional look-up table of the white balance correction amount corresponding to the amount of smear is shown. In the present exemplary embodiment, the signal processing circuit 108 holds information about a look-up table. However, it is not limited to this exemplary embodiment. It may be configured such that the ROM 118 stores the information, and the system control unit 117 reads the information from the ROM 118 and sets it to the signal processing circuit 108. T1 and T2 on the horizontal line shown in FIG. 4 correspond to T1 and T2 on the horizontal line shown in FIG. 2.

A characteristic line 401 shown in FIG. 4 indicates a one-dimensional look-up table of a white balance correction amount corresponding to the amount of smear when a color temperature of external light is normal. As shown by the characteristic line 401, when the amount of smear is in a range of a predetermined amount (in a range from 0 to a neighborhood of T2 shown in FIG. 4), the signal processing circuit 108 sets a white balance correction amount at 0. Further, when the amount of smear is a predetermined amount or larger (in a range where the amount of smear is larger than the neighborhood of T2 shown in FIG. 4), the signal processing circuit 108 sets a white balance correction amount of green in proportion to the amount of smear. More specifically, the signal processing circuit 108 executes color gain adjustment to execute white balance processing. Thus, white balance processing is executed by a white balance correction amount of green proportional to the amount of smear, so that a smear can be corrected without reducing image quality.

Further, a characteristic line 402 shown in FIG. 4 indicates a one-dimensional look-up table of a white balance correction amount corresponding to the amount of smear when external light is a high color temperature light source such as the shade when weather is fine or cloudy. In the high color temperature light source, a blue color component becomes strong. Thus, the characteristic line 402 is provided by a one-dimensional look-up table which moves the characteristic line 401 roughly parallel to the side of magenta so as to set magenta at a white balance correction amount in order to moderate a blue color component. As shown by the characteristic line 402, when the amount of smear is in a range of a predetermined amount (in a range from 0 to a neighborhood of T2 shown in FIG. 4), the signal processing circuit 108 sets a white balance correction amount at a predetermined value on the side of magenta and executes white balance processing. Further, when the amount of smear is a predetermined value or larger (in a range where the amount of smear is larger than the neighborhood of T2 shown in FIG. 4), the signal processing circuit 108 sets a white balance correction amount of magenta or green in proportion to the amount of smear and executes white balance processing.

A color temperature of external light is calculated from image information about an image signal which is subjected to image processing in the signal processing circuit 108. The signal processing circuit 108 executes image processing using the characteristic line 401 in a normal color temperature and using the characteristic line 402 in a high color temperature light source corresponding to the calculated color temperature of external light. The signal processing circuit 108 executes image processing for each image area which shows a different amount of smear as described in FIG. 3, similar to the processing in the smear correction circuit 106. Thus, image processing is executed for each image area, so that image processing suitable for an image area can be executed.

Referring back to a block diagram in FIG. 1, the system control unit 117 stores an image signal subjected to image processing in the signal processing circuit 108, in an image memory 107 as image data. The speed of the image memory 107 is sufficiently high to store a predetermined number of captured still images and moving images of predetermined time length, and has a large storage capacity. The image memory 107 is used as a work area of the system control unit 117.

A recording circuit 109 is an interface with a storage medium 110 which will be described later. The recording circuit 109 transmits and receives image data and management information attached to the image data between the recording circuit 109 and the storage medium 110.

The storage medium 110 includes a removable memory card, a hard disk or the like. The recording circuit 109 records image data which is stored in the image memory 107 on the storage medium 110.

A display device 114 includes a liquid crystal display (LCD), or the like. On the display device 114, captured image data is displayed. Further, the display device 114 can be used as an electronic finder by sequentially displaying captured image data thereon.

A display circuit 113 executes control to display captured image data or the like on the display device 114. Further, the display circuit 113 executes ON/OFF of display to the display device 114, distance measuring frame display, in-focus display, out-of-focus warning display and the like based on execution of a program under control of the system control unit 117.

Data that is displayed on the display device 114 is stored in a random access memory (RAM) 119. The display circuit 113 displays data stored in the RAM 119 on the display device 114 under control of the system control unit 117. A constant, a variable, and a program for operation of the system control unit 117 are stored in the ROM 118 and the RAM 119, A user can perform start and stop operations of still image recording and moving image recording via the switch (SW1) 115 and the switch (SW2) 116.

The system control unit 117 controls the entire imaging apparatus 100. Further, the system control unit 117 executes automatic exposure control (AE) by controlling a diaphragm and a shutter in the imaging lens 101, and an autofocus (AF) by controlling the focus drive circuit 111.

Next, referring to a flowchart shown in FIG. 5, processing of the imaging apparatus 100 will be described. In the following respective steps, when processing is performed by a main constituent other than the system control unit 117, the main constituent performs the processing under control of the system control unit 117.

First, in step S1, the system control unit 117 sets a signal output from an OB area at a predetermined value (set black signal level). For example, when a CDS/AD unit with maximum output of 14 bits is used, a maximum output signal is provided by 16383 least significant bits (LSBs). As one example, the system control unit 117 adjusts the CDS/AD unit so that an OB pixel output value and a dummy pixel output value is provided by 5% (819 LSBs) of the maximum output value. The OB pixel output value and the dummy pixel output value are output as an adjusted value if a noise signal such as a smear is not superimposed.

Next, in step S2, the smear detection circuit 105 detects a smear signal. Since the smear signal is a noise signal superimposed on the OB pixel output value and the dummy pixel output value, the smear detection circuit 105 subtracts the adjusted value from an OB signal and a dummy signal, thereby detecting the amount of smear. In the present exemplary embodiment, the smear detection circuit 105 can detect the amount of smear in a range of 1 to 15564 LSBs. The smear detection circuit 105 divides an image area corresponding to the detected amount of smear. In the following step, processing is executed for each divided image area.

Next, in step S3, the smear correction circuit 106 determines whether the amount of smear detected in the smear detection circuit 105 is within a first predetermined range. For example, in a case of the characteristic line 302 shown in FIG. 2, the smear correction circuit 106 determines whether the amount of smear is provided within a range of 0 to T1 shown in FIG. 2. According to the result in step S3, it is determined whether a parameter concerning image quality such as a parameter of white balance processing and a parameter of color processing which will be described later, is to be corrected. If the amount of smear is within the first predetermined range (YES in step S3), the system control unit 117 advances processing to step S4. If the amount of smear is not within the first predetermined range (NO in step S3), the system control unit 117 advances the processing to step S6.

In step S4, the smear correction circuit 106 sets a smear correction amount at a predetermined lower limit value (lower limit value clip processing). Subsequently, the smear correction circuit 106 executes smear correction by the set smear correction amount. For example, in a case of the characteristic line 302 shown in FIG. 2, since a smear correction amount is 0, the smear correction circuit 106 does not execute smear correction.

Next, in step S5, the signal processing circuit 108 executes image processing to an image signal subjected to smear correction with a predetermined lower limit value (normal image processing), similar to the processing for an image in which a smear does not occur. At this time, the system control unit 117 detects a color temperature of external light of an image signal to be processed by the signal processing circuit 108. The signal processing circuit 108 sets a white balance correction amount or the like used when white balance processing is executed, from the detected color temperature. For example, in a normal light source, the signal processing circuit 108 sets a white balance correction amount at 0 based on the characteristic line 401 shown in FIG. 4 (the amount of smear is in a range of 0 to T1). Further, in a high color temperature light source, the signal processing circuit 108 sets a white balance correction amount such that magenta becomes strong based on the characteristic line 402 shown in FIG. 4, and executes white balance processing. Furthermore, the signal processing circuit 108 executes image processing such as pixel interpolation processing.

In step S6, the smear correction circuit 106 determines whether smear correction can be completely executed, from the amount of smear detected in the smear detection circuit 105. In this step, the smear correction circuit 106 determines whether the amount of smear is within a second predetermined range. For example, in the characteristic line 302 shown in FIG. 2, the smear correction circuit 106 determines whether the amount of smear is within a range of T1 to T2 shown in FIG. 2. If the amount of smear is within the second predetermined range (YES in step S6), the processing proceeds to step S7. If the amount of smear is not within the second predetermined range (NO in step S6), the processing proceeds to step S8.

In step S7, the smear correction circuit 106 subtracts a smear correction amount corresponding to the amount of smear from an image signal and executes smear correction. In the characteristic line 302 shown in FIG. 2, the smear correction circuit 106 executes smear correction by a smear correction amount proportional to the amount of smear. Subsequently, the signal processing circuit 108 executes image processing to an image signal executing smear correction, similar to step S5.

In step S8, the smear correction circuit 106 sets a smear correction amount at a predetermined upper limit value (upper limit value clip processing). Next, the smear correction circuit 106 executes smear correction by the set smear correction amount. For example, in a case of the characteristic line 302 shown in FIG. 2, since the upper limit value of a smear correction amount is "R", the smear correction circuit 106 sets a smear correction value at "R" and executes smear correction.

Next, in step S9, the signal processing circuit 108 executes image processing corresponding to the amount of smear, to an image signal subjected to smear correction with a predetermined upper limit value (adaptive signal processing). At this time, the system control unit 117 detects a color temperature of external light of an image signal which is processed in the signal processing circuit 108. The signal processing circuit 108 sets a white balance correction amount or the like used when white balance processing is executed, from the detected color temperature. For example, in a normal light source, the signal processing circuit 108 sets a white balance correction amount such that green becomes strong corresponding to the detected smear amount based on the characteristic line 401 shown in FIG. 4 (in a range where a smear amount is larger than T2), and executes white balance processing. Further, in a case of a high color temperature light source, the signal processing circuit 108 sets a white balance correction amount such that magenta becomes weak in proportion to the detected amount of smear based on the characteristic line 402 shown in FIG. 4 and executes white balance processing. Further, when a predetermined smear amount is exceeded, the signal processing circuit 108 sets a white balance correction amount such that green becomes strong in proportion to the amount of smear and executes white balance processing. Furthermore, the signal processing circuit 108 sets a parameter concerning image quality of color signal processing or the like corresponding to the detected amount of smear at a suitable value and executes image processing.

Similarly, the signal processing circuit 108 executes the processing from the above-described step S3 to step S9, for each image area divided in step S2. Thus, smear correction and image processing are executed for each divided image area, so that suitable smear correction and image processing can be executed for each image area.

According to the above-described exemplary embodiment, when the detected smear amount is larger than a predetermined value, a smear correction amount is set at an upper limit value to execute smear correction, so that an image signal can be prevented from becoming too small due to overcorrection. On the other hand, even if smear correction is not sufficiently executed because an upper limit is set, in executing white balance processing based on the detected amount of smear and compensate correction of a smear, a smear can be made inconspicuous. In the present exemplary embodiment, only a case in which smear correction and image processing are executed based on the detected amount of smear has been described. However, it is not limited to this exemplary embodiment. For example, the signal processing circuit 108 may execute image processing based on a smear correction amount.

Each unit which forms an imaging apparatus or each step of an image processing method of an imaging apparatus in the above-described exemplary embodiment of the present invention can be realized by operating a program stored in a RAM or a ROM of a computer. The program and a computer readable recording medium recording the program are included in the present invention.

Further, the present invention includes an exemplary embodiment such as a system, an apparatus, a method, and a program or a computer-readable storage (recording) medium. More specifically, the present invention may be applied to a system including a plurality of instruments.

The present invention supplies a program of software that realizes a function of the above-described exemplary embodiment directly, or from a remote place to a system or an apparatus. Then, the present invention can be realized by causing a computer of a system or an apparatus to read and execute the supplied program code.

Accordingly, in order to implement function processing of the present invention by a computer, a program code itself which is installed on the computer also realizes the present invention. That is, the present invention also includes a computer program itself for realizing function processing of the present invention. In this case, the present invention may be in the form of an object code, a program to be executed by an interpreter, script data to be supplied to an operating system (OS) or the like if it includes the function of a program.

Further, the function of the above-described exemplary embodiment is realized by causing a computer to read and execute a program. Furthermore, based on the command of the program, OS or the like which runs on a computer, executes a part or the whole of actual processing, and thus, the function of the above-described exemplary embodiment can also be realized.

Furthermore, as other methods, a program read from a computer-readable storage (recording) medium is written in a memory provided in a function expansion board inserted in a computer or a function expansion unit connected to a computer. Based on the command of its program, a central processing unit (CPU) or the like provided in a function expansion board or a function expansion unit executes a part or the whole of actual processing, and thus the function of the above-described exemplary embodiment can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-167871 filed Jun. 26, 2008, which is hereby incorporated by reference herein in its entirety.

What is claimed is:

1. An imaging apparatus comprising:
a smear detection unit configured to detect an amount of smear from an image signal;
a smear correction unit configured to execute smear correction based on the detected amount of smear;
an image processing unit configured to execute image processing based on the detected amount of smear; and
a color temperature detection unit configured to execute color temperature detection,
wherein the image processing unit executes image processing based on the detected amount of smear and a detected color temperature,
wherein the image processing unit executes image processing that reduces an extent of change in image color caused by smear when the detected amount of smear exceeds an upper value of the smear correction unit.

2. The imaging apparatus according to claim 1, wherein the smear correction unit limits a smear correction amount based on the detected amount of smear.

3. The imaging apparatus according to claim 1, wherein the image processing unit executes white balance processing based on the detected amount of smear.

4. The imaging apparatus according to claim 1, wherein the image processing unit executes color gain adjustment based on the detected amount of smear.

5. The imaging apparatus according to claim 1, wherein the smear detection unit detects an image area where a smear occurs, and
wherein the smear correction unit executes smear correction for each detected image area.

6. The imaging apparatus according to claim 5, wherein the image processing unit executes image processing based on the detected amount of smear for each detected image area.

7. The imaging apparatus according to claim 1, wherein the image processing unit causes the smear correction unit to execute image processing corresponding to a smear correction amount set based on the amount of smear.

8. An image processing method comprising:
detecting an amount of smear from an image signal;
executing smear correction based on the detected amount of smear;
executing image processing based on the detected amount of smear;
detecting color temperature; and
executing image processing based on the detected amount of smear and the detected color temperature,
wherein executing image processing reduces an extent of change in image color caused by smear when the detected amount of smear exceeds an upper value of smear.

9. The image processing method according to claim 8 further comprising:
executing white balance processing based on the detected amount of smear.

10. The image processing method according to claim 8 further comprising:
executing color gain adjustment based on the detected amount of smear.

11. The image processing method according to claim 8 further comprising:
detecting an image area where a smear occurs; and
executing smear correction for each detected image area.

12. A non-transitory computer-readable storage medium storing a program causing a computer to execute processing for controlling an apparatus, the processing comprising:
detecting an amount of smear from an image signal;
executing smear correction based on the detected amount of smear;
executing image processing based on the detected amount of smear;
detecting color temperature; and
executing image processing based on the detected amount of smear and the detected color temperature,
wherein executing image processing reduces an extent of change in image color caused by smear when the detected amount of smear exceeds an upper value of smear.

13. The non-transitory computer-readable storage medium according to claim 12, further comprising:
executing white balance processing based on the detected amount of smear.

14. The non-transitory computer-readable storage medium according to claim 12 further comprising:
executing color gain adjustment based on the detected amount of smear.

15. The non-transitory computer-readable storage medium according to claim 12 further comprising:
detecting an image area where a smear occurs; and
executing smear correction for each detected image area.

* * * * *